(12) United States Patent
Kramer et al.

(10) Patent No.: US 10,539,121 B2
(45) Date of Patent: Jan. 21, 2020

(54) WIND POWER PLANT AIR DUCT AND METHOD OF MANUFACTURING THE SAME

(71) Applicant: AREVA Wind GmbH, Bremerhaven (DE)

(72) Inventors: Thomas Kramer, Brake (DE); Roland Schumacher, Bremen (DE)

(73) Assignee: Areva Wind GmbH (DE)

( * ) Notice: Subject to any disclaimer, the term of this patent is extended or adjusted under 35 U.S.C. 154(b) by 452 days.

(21) Appl. No.: 15/303,233

(22) PCT Filed: Apr. 15, 2015

(86) PCT No.: PCT/EP2015/058199
§ 371 (c)(1),
(2) Date: Oct. 11, 2016

(87) PCT Pub. No.: WO2015/158788
PCT Pub. Date: Oct. 22, 2015

(65) Prior Publication Data
US 2017/0030338 A1 Feb. 2, 2017

(30) Foreign Application Priority Data
Apr. 15, 2014 (EP) .................................. 14164790

(51) Int. Cl.
*F03D 80/80* (2016.01)
*F03D 13/20* (2016.01)
*F03D 80/60* (2016.01)

(52) U.S. Cl.
CPC ............. *F03D 80/80* (2016.05); *F03D 13/20* (2016.05); *F03D 80/60* (2016.05);
(Continued)

(58) Field of Classification Search
CPC ........... F03D 80/80; F03D 80/60; F03D 13/20
See application file for complete search history.

(56) References Cited

U.S. PATENT DOCUMENTS

| 9,228,566 B2 | 1/2016 | Pasteuning et al. |
| 2009/0223163 A1* | 9/2009 | Quek ...................... E04H 12/02 52/651.01 |

(Continued)

FOREIGN PATENT DOCUMENTS

| EP | 2453451 A2 | 5/2012 |
| EP | 2503144 A1 | 9/2012 |

(Continued)

OTHER PUBLICATIONS

English Translation of Office Action in JP counterpart Application No. 2016-562888, dated Sep. 5, 2017.
(Continued)

*Primary Examiner* — Jason D Shanske
*Assistant Examiner* — John S Hunter, Jr.
(74) *Attorney, Agent, or Firm* — Schmeiser, Olsen & Watts LLP

(57) ABSTRACT

An air duct for a wind power plant is configured to guide air along a circumference of a supporting structure, in particular a tower, of the wind power plant. The wind power plant also includes an air guide and provides methods of manufacturing the air guide for the wind power plant and retrofitting the wind power plant with the air guide.

16 Claims, 10 Drawing Sheets

(52) U.S. Cl.
CPC ....... *F05B 2230/60* (2013.01); *F05B 2230/80* (2013.01); *F05B 2260/20* (2013.01); *F05B 2260/64* (2013.01); *F05B 2280/2001* (2013.01); *F05B 2280/4003* (2013.01); *Y02E 10/725* (2013.01); *Y02P 70/523* (2015.11)

(56) References Cited

U.S. PATENT DOCUMENTS

| | | |
|---|---|---|
| 2012/0266995 A1 | 10/2012 | Carson |
| 2013/0296085 A1* | 11/2013 | Parenti .................. A63B 39/06 473/611 |
| 2014/0318060 A1 | 10/2014 | Tschirch |

FOREIGN PATENT DOCUMENTS

| | | |
|---|---|---|
| EP | 2568170 A1 | 3/2013 |
| JP | 2012102692 | 5/2012 |
| KR | 1020020021156 | 3/2002 |
| KR | 100967160 | 7/2010 |

OTHER PUBLICATIONS

Office Action from Korean counterpart application, including English translation, dated Mar. 22, 2017.
International Search Report, dated Jun. 23, 2015.
International Preliminary Report on Patentability, dated Oct. 18, 2016.
Office Action from Chinese counterpart application, including English translation, dated Jul. 4, 2018.
Chinese Office Action dated May 10, 2019 for Application No. 201580020151.6.

* cited by examiner

WIND POWER PLANT AIR DUCT AND METHOD OF MANUFACTURING THE SAME

CROSS-REFERENCE TO RELATED APPLICATIONS

This application is the U.S. national phase of PCT/EP2015/058199, filed Apr. 15, 2015, which claims priority to EP 14 164 790.9, filed Apr. 15, 2014.

FIELD OF THE INVENTION

The invention relates to an air duct for a wind power plant configured to guide air along a circumference of a supporting structure, in particular a tower, of the wind power plant. The invention also relates to a wind power plant with an air guide and to methods of manufacturing an air guide for a wind power plant and retrofitting a wind power plant with an air guide.

BACKGROUND

Cooling systems for wind power plants or wind turbines are well known in the art. The conversion of wind energy into electric energy produces heat in the various components of the wind power plant. In order to dissipate the heat, air cooling systems are integrated into the wind power plants.

WO 2010/069954 A1 describes a wind turbine with a closed air cooling circuit. Outside air is kept from entering the wind turbine to protect the electric equipment against salt and humidity. The wind turbine is divided by a number of platforms. A pipeline leads air between the upper and lower part of the wind turbine.

In other known solutions of heat dissipation, inlets are formed in a section of the tower wall for introducing air surrounding the wind turbine tower into the wind turbine tower. Cool air surrounding the wind turbine tower is drawn into the tower through the inlets formed in the tower wall. The cool air can then take up the excess heat and leave the tower.

EP 2 568 170 A1 discloses a wind turbine with a tower wall reinforcement that defines an air duct for guiding air along the inner circumference of the tower wall section. Due to the tower wall reinforcement that braces the inner circumference of the tower wall section having the air introducing inlets, the stability of the wind turbine tower is maintained despite the weakness introduced by the one or more inlets. There is no need to frame each inlet, which makes the tower easier to build.

SUMMARY

It is an object of the invention to provide an air duct that overcomes the drawbacks of the prior art.

In an aspect of the invention, an air duct for a wind power plant is provided. The air duct is configured to guide air along a circumference of a supporting structure, in particular a tower, of the wind power plant. The air duct can advantageously be conceived as a separate member, i.e. separate from the wind power plant. In other words, the air duct is not integrated into the wall of the supporting structure of the wind power plant. This simplifies manufacturing of the air duct and the wind power plant.

The air duct can be located inside the supporting structure, in particular along an inner side of a wall of the supporting structure, as for example inside a tower.

The air duct can comprise a plurality of air inlets.

The air inlets of the air duct can be substantially evenly distributed along the air duct and/or around the circumference of the supporting structure. This improves air distribution and effective air inlet.

The air duct can have a polygonal cross-section, in particular the air duct can include V-shape cross-sectional portions. This simplifies securing and allows proper and tight coupling of segments of the air duct.

The air duct can comprise at least one first segment comprising an inlet (nose/projections). The air duct can further comprise at least one second segment to couple the first segments to each other. The air duct can comprise at least one third segment to couple the air duct to an internal substantially vertical (for example tubular) air guiding structure. The air vent is in fluid communication with the air duct. The air vent serves as an outlet for the air circulating in the air duct.

The air duct can comprise at least one water drop separator or air conditioner. This aspect provides that water and/or aerosols are removed from the air before the air enters the air guiding systems of the wind power plant.

The air duct advantageously comprises one or more sets of similar or equal segments. A first set may comprise at least one first segment comprising an inlet (nose/projections). A second set may comprise at least one second segment to couple the first segments to each other. A third set may comprise at least one third segment to couple the air duct to an internal substantially vertical tubular air guiding structure. Using similar or identical segments simplifies manufacturing and can reduce manufacturing costs.

The third segment can be configured such that it accommodates at least one water drop separator or air conditioner. The third segment may then have two symmetrical sections on opposite sides of the connection to the substantially vertical tubular air guiding structure. Each of the two sections of the third segment may then accommodate one water drop separator.

The air duct can further comprise fixed structure to compile the air duct to the tower. The fixed structure can be configured as braces or frames to support the air duct.

The air duct can comprise at least two segments (or more as set out above) Adjacent segments can then have ends which are flush. Adjacent segments can have corresponding flanged ends. Adjacent or consecutive segments can be fixed to each other by a securing member, in particular a securing member encompassing the outer circumferential ends of adjacent or consecutive segments. This is a simple and effective way of coupling the segments.

The air duct can further comprise an air duct suspension in form of a belt. The belt can be coupled to the braces which are fixed to the wall of the supporting structure of the wind power plant. The belt can be wound around the air duct and run through openings in upper and lower struts of the braces. This provides an elastic but robust suspension for the air duct.

The air duct and/or the segments of the air duct can be made of at least one of glass-fiber, plastic, and/or polymer. This can decrease weight compared with steel or metal, make manufacturing and mounting of the air duct easier, and increase robustness and endurance.

The invention also provides a supporting structure of a wind power plant comprising an air duct in accordance with the aspects and embodiments described herein.

The invention further provides a wind power plant comprising an air duct according to anyone of the aspects and embodiments described herein.

The invention also provides a method of manufacturing an air duct. Accordingly, an air duct is manufactured (or composed or assembled) of one or more segments. At least two segments can be similar or identical.

The invention further provides a method of retrofitting a wind power plant with an air duct according to aspects and embodiments described herein.

According to an advantageous aspect of the previously mentioned methods, the air duct can be assembled within a tower of the wind power plant. This simplifies transport and assembling of the air duct, in particular if a wind power plant is retrofitted with the air duct in accordance with aspects and embodiments of the invention.

The invention also provides a wind power farm or wind power park comprising a wind power plant with an air duct according to aspects and embodiments described herein.

DETAILED DESCRIPTION

Figure 1:
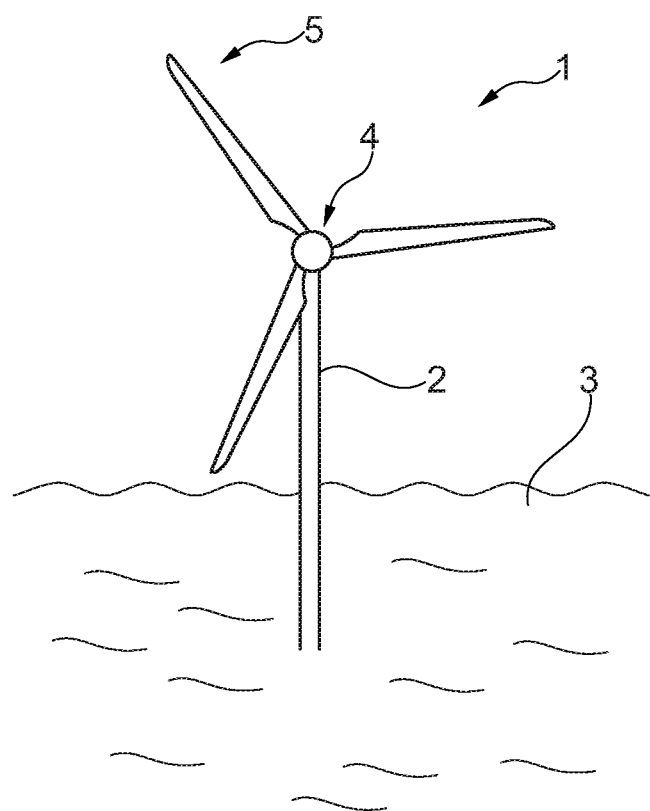
FIG. 1 is a simplified schematic of a wind power plant according to an embodiment of the invention.

FIG. 1 shows a simplified wind power plant 1 according to an embodiment of the invention. The wind power plant 1 comprises a supporting structure 2, which is based on a suitable foundation in the sea 3. By way of an example only, the wind power plant 1 is an offshore wind generator. The rotor hub 4 carries a plurality of rotor blades 5. A nacelle (not visible) is arranged at the top of the supporting structure 2, which may be for example a tower. The tower 2 can comprise an air duct (not visible here) in accordance with the aspects and embodiments of described herein.

Figure 2:
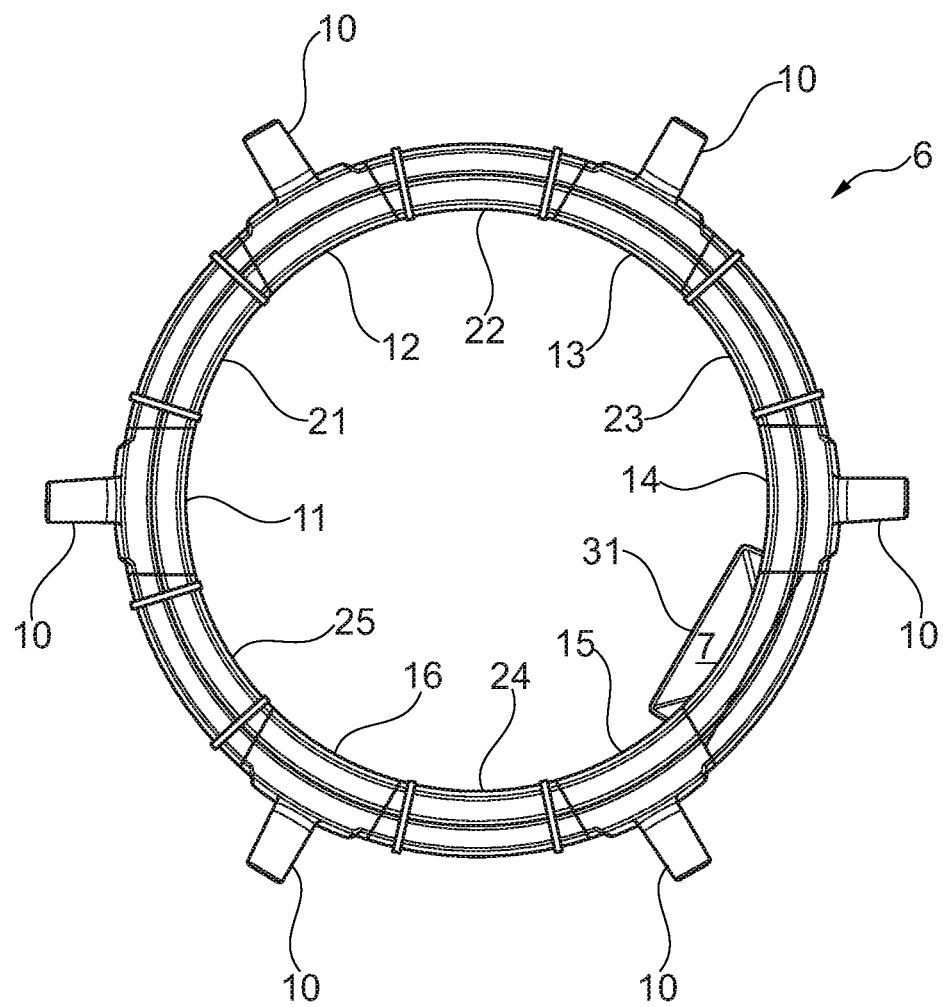
FIG. 2 is a simplified schematic of an air duct for a wind power plant according to an embodiment.

FIG. 2 is a simplified schematic of an air duct 6 for a wind power plant according to an embodiment. The air duct 6 has a circular shape and is composed of segments. First segments 11, 12, 13, 14, 15, and 16 are segments comprising air inlets 10 that protrude from the outer circumference of the air duct. The first segments 11 to 16 are evenly distributed around the circumference of the air duct 6. The first segments 11 to 16 are coupled by second segments 21, 22, 23, 24 and 25. Only first segments 14 and 15 are coupled by a third segment 31 which comprises an air vent 7.

The air duct 6 is a separate component that can be mounted to a supporting structure (for example a tower) of a wind power plant. The air duct 6 is not integrated into the wall of the supporting structure of the wind power plant.

The air duct 6 comprises six segments of a first type (first segments 11 to 16), five segments of a second type (second segments 21 to 25) and one segment 31 of a third type. Accordingly, there is a first set of first segments 11 to 16, a second set of second segments 21 to 25 and third set comprising a single third segment 31. Using similar or identical segments simplifies production and reduces production costs.

Figure 3:
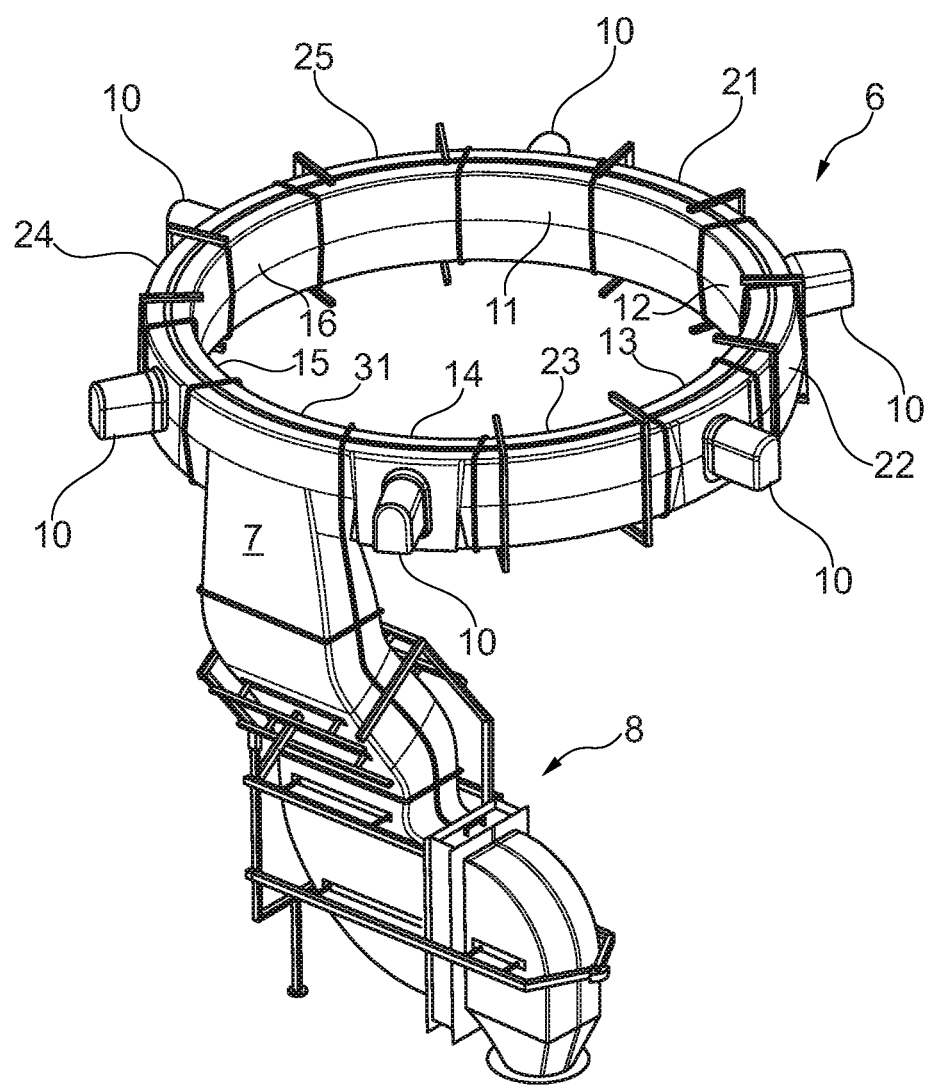
FIG. 3 is a simplified perspective view on an air duct for a wind power plant according to an embodiment.

FIG. 3 is a simplified perspective view on an air duct 6 for a wind power plant according to an embodiment. The air duct 6 is basically similar to the one shown in FIG. 2. The air duct 6 is configured to be fixed horizontally in the supporting structure (tower) of a wind power plant. There is further an air guiding member 8 which is coupled to the air vent 7 of the third segment 31. The air guiding member 8 extends downwardly and inside the supporting structure of a wind power plant.

Figure 4:
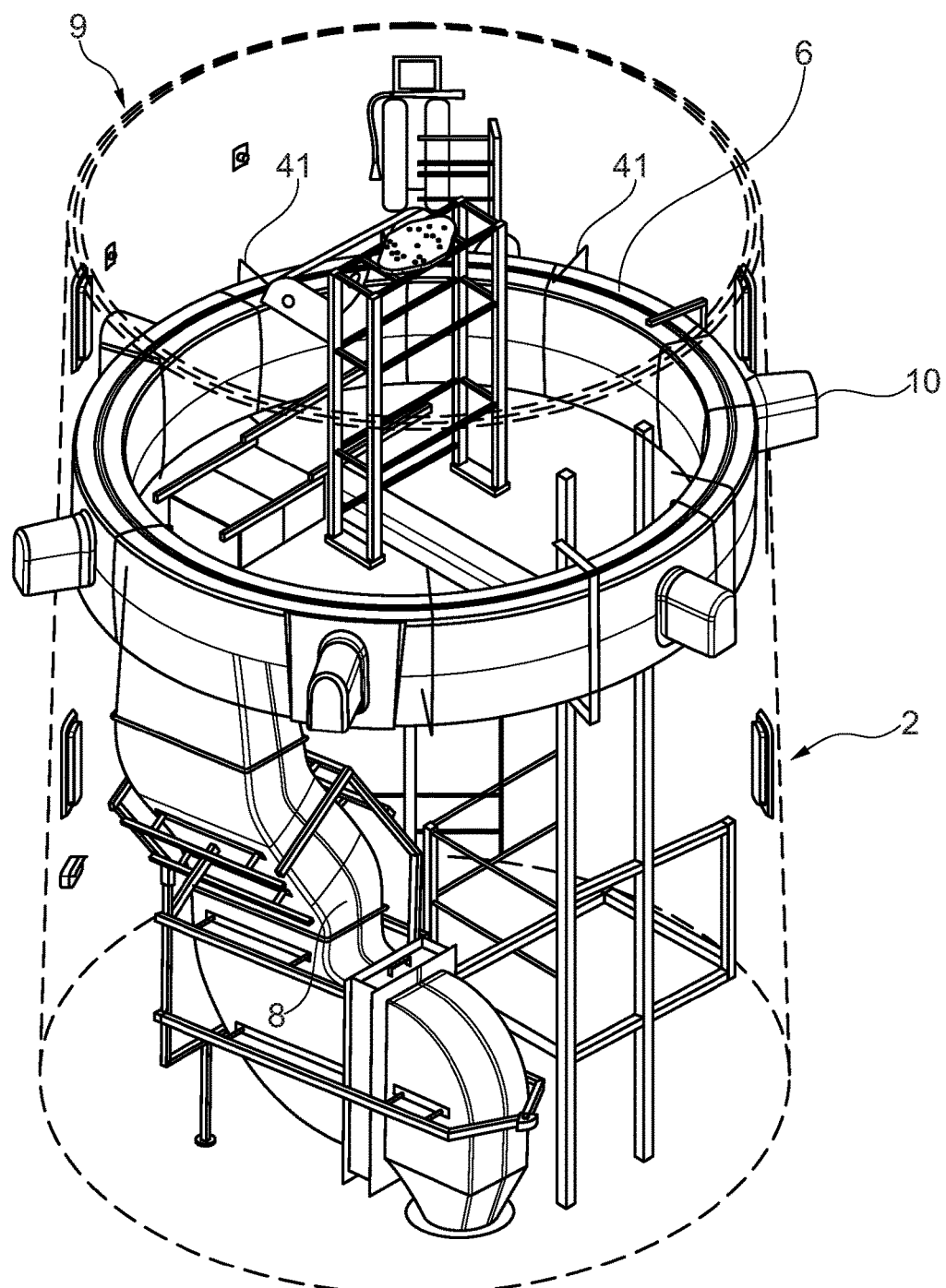
FIG. 4 is a simplified perspective on the air duct shown in FIG. 3 mounted in a tower of a wind power plant.

FIG. 4 is a simplified perspective on the air duct 6 shown in FIG. 3 mounted in a supporting structure, here a tower 2 of a wind power plant. The air duct 6 is oriented horizontally and located inside the wall 9 of the tower 2. The air duct 6 extends along the inner side (along the circumference) of the wall 9 of the wind power plant. The noses 10 of the air duct 6 protrude outwardly from the air duct 6 and extend through the wall 9 of the tower 2. The air guiding member 8 extends downwardly into the tower 2. It is apparent that the air duct 6 is not integrated into the wall 9 of the tower 2. This allows retrofitting the wind power plant with an air duct 6 and generally simplifies assembly of the wind power plant. Manufacturing of the air duct 6 and mounting the air duct 6 to the tower 2 is particularly simplified if the air duct 6 is composed of segments, in particular a plurality of similar or identical segments.

The air duct 6 is supported by braces 41 which are fixed to the inner side of the wall 9 of the wind power plant. The braces 41 can be more or less evenly distributed along the air duct 6.

FIGS. 5A to 5F are simplified schematics of details of an air duct 6 according to an embodiment.

Figure 5:
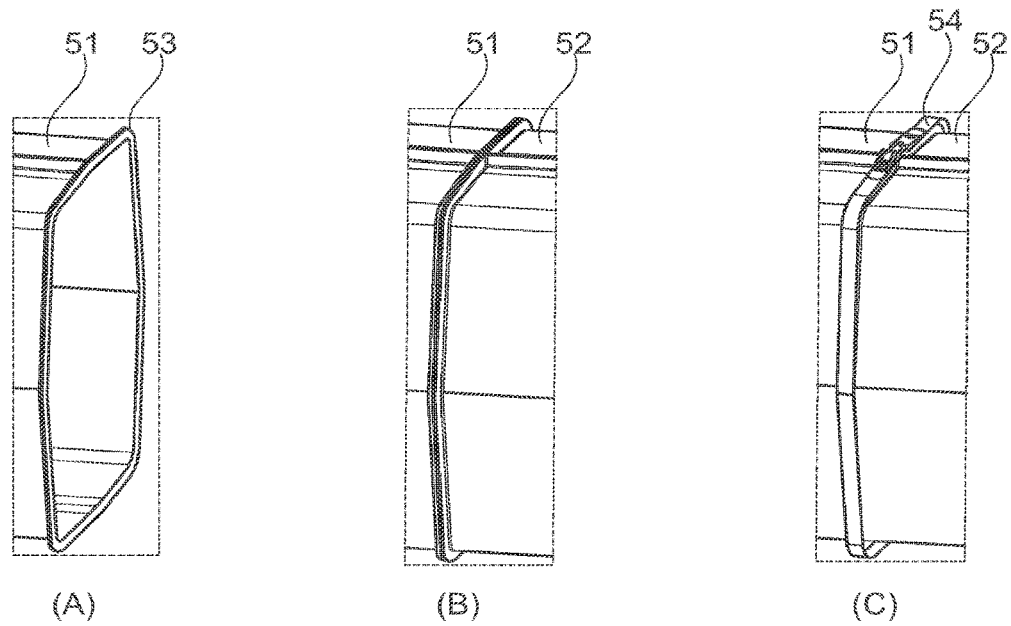
FIGS. 5A to 5G are simplified schematics of details of an air duct according to an embodiment.
Figure 5:
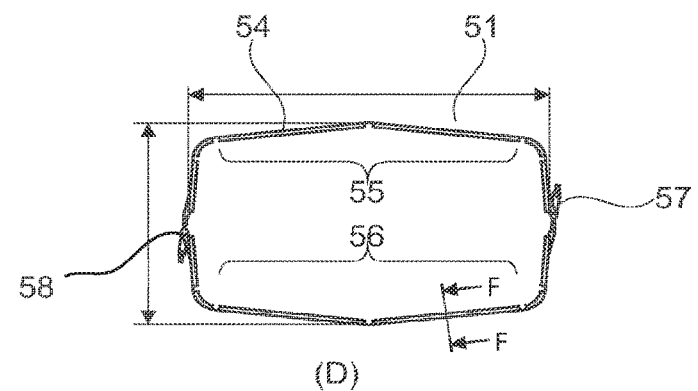
Figure 5:
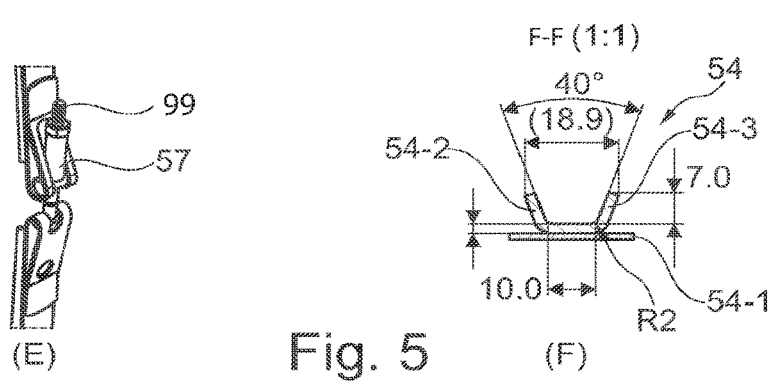

FIG. 5A shows an end of a segment 51, either a first segment, a second segment or a third segment, of the air duct 6. The end has a flange 53.

FIG. 5B shows the flanged ends of two adjacent segments 51, 52, which are, for example first and second segments or first and third segments. The two segments 51, 52 are coupled flush together. The flanges of two adjacent segments 51, 52 lie against each other.

FIG. 5C shows a securing member 54 which encompasses the outer circumference and thereby the flush flanges of the two adjacent segments 51, 52. The securing member 54 holds the adjacent segments 51, 52 of the air duct 6 together.

FIG. 5D shows a cross-section of segments 51, 52 through the securing member 54 shown in FIG. 5D. Each of the segments can be a first segment, a second segment or a third segment. The cross section of the segments has two V-shaped portions 55, 56 on opposite sides. There are two locks 57, 58 on the securing member 54 for tensioning and securing the securing member 54 around the ends of the two adjacent segments 51, 52.

FIG. 5E shows one of the locks 57, 58 shown in FIG. 5D. The lock 57 comprises a tensioning screw 99 for increasing the tension of the securing member 54.

Figure 5G:
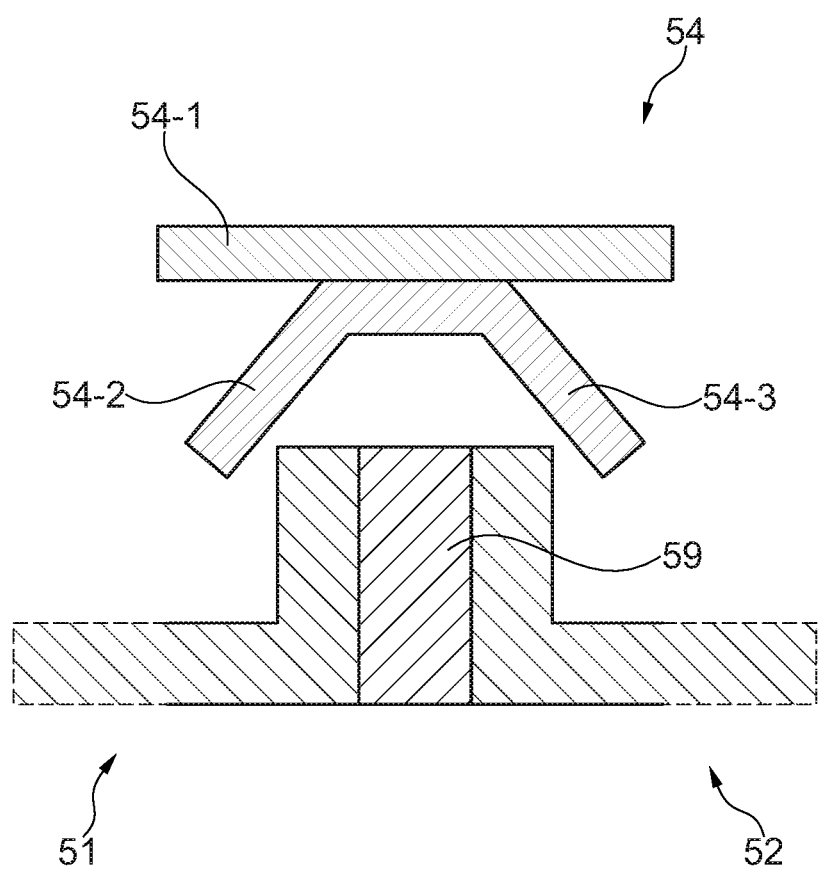

FIG. 5F shows a cross sectional view of the profile of the securing member 54 taken at arrows F-F. The cross-sectional shape of the securing member is designed to press the flanges of two adjacent segments together and against a gasket 59 (as shown in FIG. 5G). The securing member 54 basically comprises two parts, which includes one flat part 54-1 and another trapezoidal part having two flanges 54-2 and 54-3 extending from the flat part 54-1. The flanges 54-2 and 54-3 extend outwardly in order to provide a higher pressure once the securing element 54 is placed and tightened around the end flanges of two adjacent segments 51, 52. In this embodiment, the angle between the flanges 54-2 and 54-3 is about 40°.

FIG. 5G shows the cross sectional view of FIG. 5F and the gasket 59. This gasket 59 is made of an elastic material (for example foam or rubber) in order to add a resilient member between the flanges of the adjacent segments 51, 52 to allow tightening of the construction with the securing member 54 which has a trapezoidal shape for the purpose of tightening. As previously described, the securing member 54 basically comprises two parts that include one flat part 54-1 and another trapezoidal part having two flanges 54-2 and 54-3 extending with a relative angle of 40° from the flat part 54-1. The flanges 54-2 and 54-3 are bent outwardly in order to provide a higher pressure once the securing element 54 is placed and tightened around the end flanges of two adjacent segments 51, 52.

Figure 6:
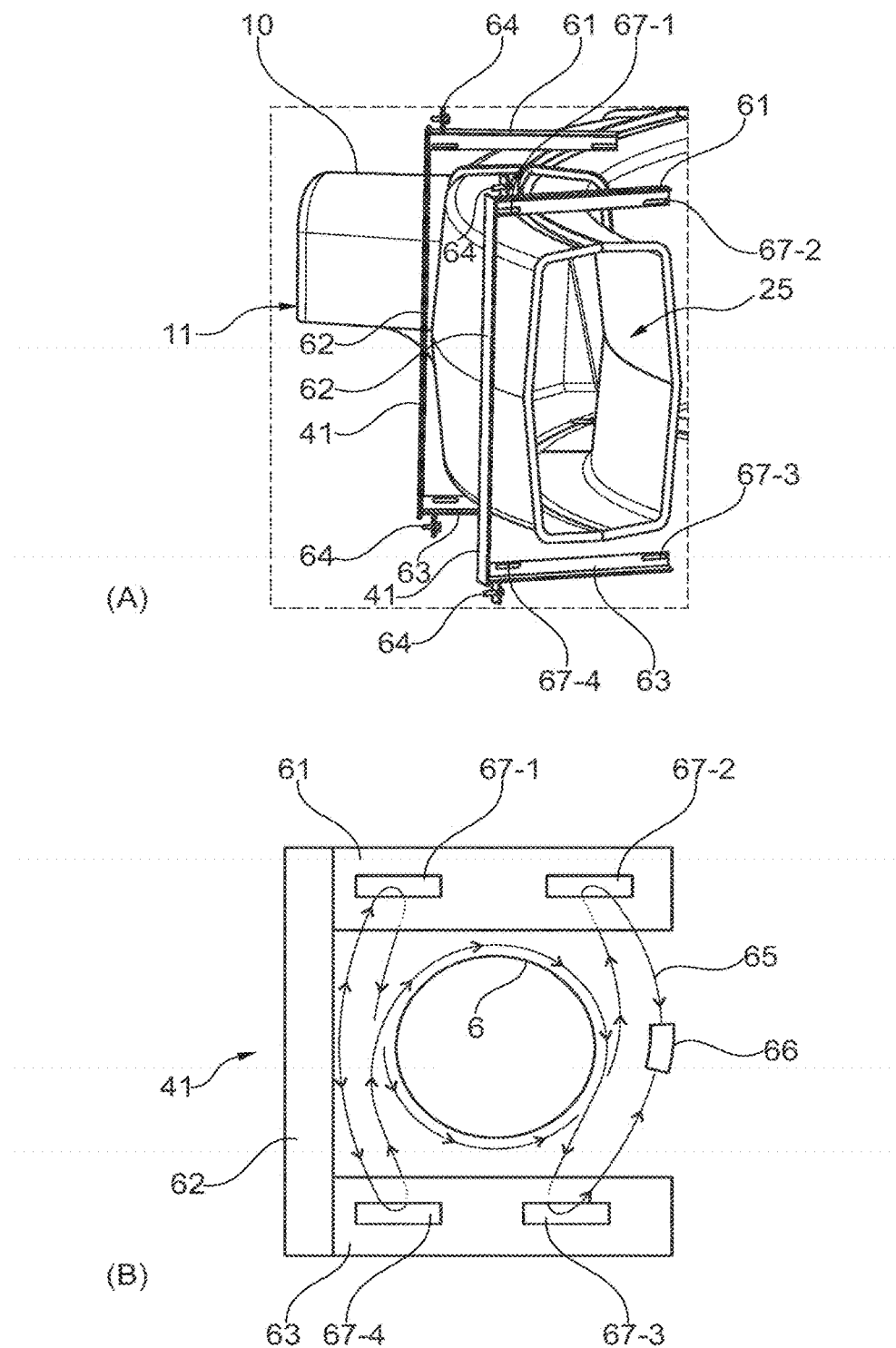
FIG. 6A and 6B are simplified schematics of a supporting arrangement for the air duct according to an embodiment.

FIG. 6A and 6B are simplified schematics of a supporting arrangement for the air duct 6 according to an embodiment. There are two supporting braces 41. Each of the supporting braces 41 has an upper strut 61, a lower strut 63 and a central strut 62 connecting the upper strut 61 and the lower strut 63. The upper strut 61 and the lower strut 63 extend from the inner wall of the tower of the wind power plant over the air duct 6, here segments 25 and 11. The central strut 62 extends vertically along the inner side of the wall of the wind power plant. Screws 64 or bolts can be used to fix the brace 41 to the inner side of the wall of a tower of a wind power plant. There is a first opening 67-1 in the upper strut 61, a second opening 67-2 in the upper strut 61 and a first opening 67-3 in the lower strut 63 and a second opening 67-4 in the lower strut 63. A belt or the like (not shown here) can extend through the first opening 67-1 in the upper strut 61 then encompass the lower side of the air duct 6 segment, extend through the second opening 67-2 in the upper strut 61 then run to a first opening 67-3 in the lower strut 63 encompass the upper side of the air duct 6 segment and then run through the second opening 67-4 in the lower strut 63 in order to secure the air duct to the supporting braces 41.

FIG. 6B shows a simplified schematic of a suspension of the air duct 6 within a brace 41. A belt 65 can be wound around the air duct 6 and through openings 67 in the brace 41, in particular through openings 67 in the upper strut 61 and the lower strut 63 of the brace 41. The belt 65 can extend through a first opening 67-1 in the upper strut 61 then encompass the lower side of the air duct 6 segment, extend through the second opening 67-2 in the upper strut 61 then run to a first opening 67-3 in the lower strut 63 encompass the upper side of the air duct 6 segment and then run through the second opening 67-4 in the lower strut 63. A locking device 66 may be used to couple and secure the ends of the belt. This kind of suspension using braces 41 and belts 65 can be used along the air duct 6 and might be evenly distributed and/or in accordance with the load distribution. This provides a resilient but stable suspension of the air duct 6.

Figure 7:
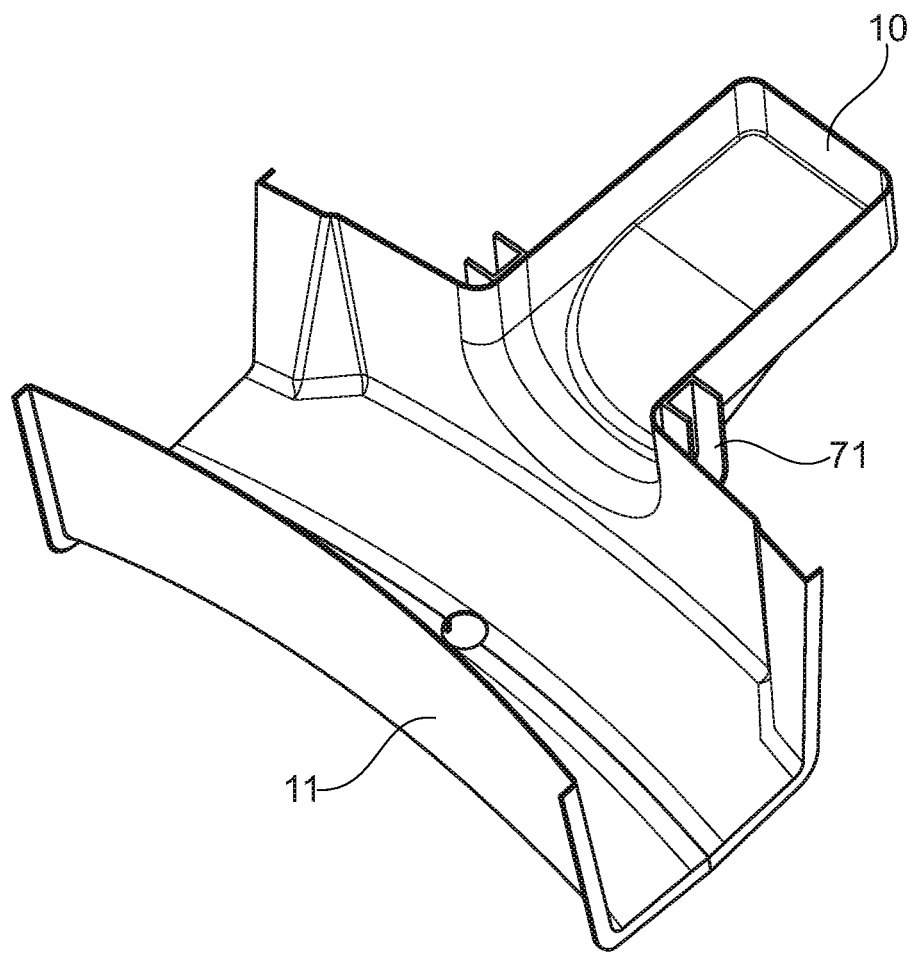
FIG. 7 is a simplified schematic of a sealing for a segment of the air duct according to an embodiment.

FIG. 7 is a simplified schematic of a detail of a sealing 71 for a first segment 11 of the air duct 6 according to an embodiment. The sealing 71 encompasses the inlet portion 10 of segment 11 and resides between the inner side of the wall of the tower of the wind power plant and the air duct 6. This provides a tight and robust protection against water etc.

Figure 8:
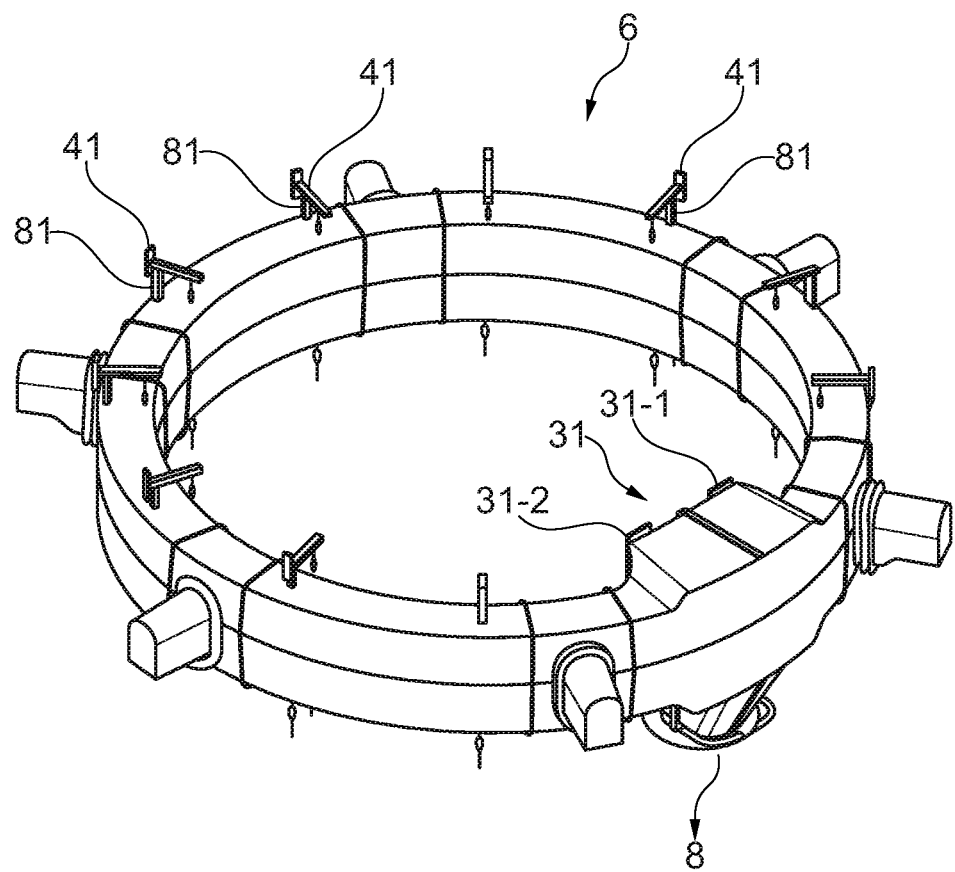
FIG. 8 is a simplified perspective view on an air duct for a wind power plant according to an embodiment.

FIG. 8 is a simplified perspective view on an air duct 6 for a wind power plant according to an embodiment. In this embodiment, the third segment 31 (substantially as previously described) can be configured such that it accommodates at least one water drop separator or air conditioner (not shown). The third segment 31 may then have two symmetrical sections 31-1 and 31-2 on opposite sides of the connection to the substantially vertical tubular air guiding structure (air guiding member 8). Each of the two sections 31-1 and 31-2 of the third segment 31 may then accommodate one water drop separator or air conditioner. As shown in FIG. 8, the air duct 6 may also be coupled to braces 41 by chains 81 or the like instead of belts. The chains 81 may then directly be coupled to the segments of the air duct 6 by hooks or other fixed structures. The third segment 31 of this embodiment is shown in more detail in FIG. 9.

Figure 9:
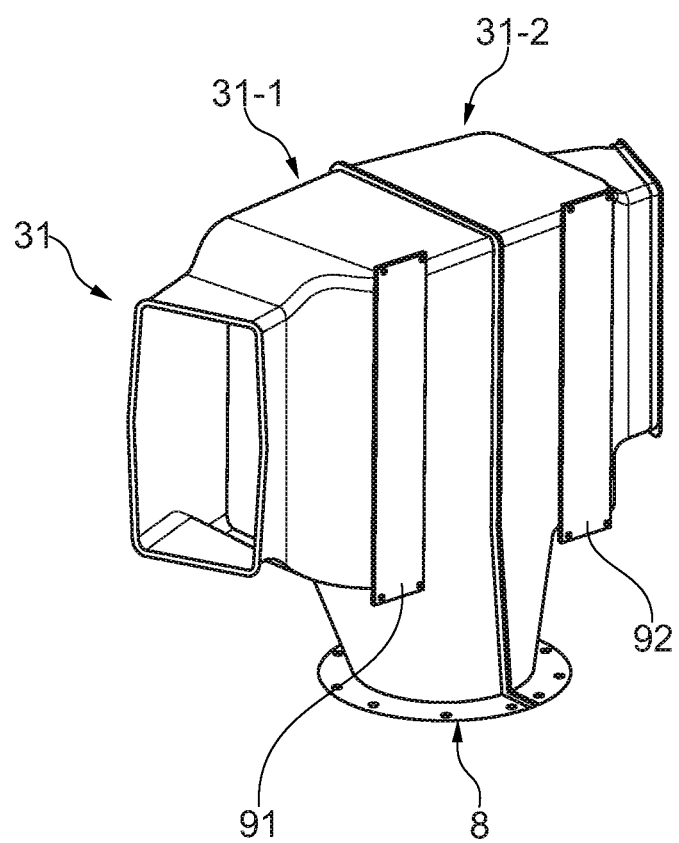
FIG. 9 is a simplified perspective view on a third segment for an air duct for a wind power plant according to the embodiment shown in FIG. 8.

FIG. 9 is a simplified perspective view on a third segment 31 for an air duct 6 for a wind power plant according to the embodiment shown in FIG. 8. In this embodiment, the third segment 31 comprises two symmetrical sections 31-1 and 31-2 on opposite sides of the connection to the substantially vertical tubular air guiding structure (air guiding member 8). Each of the two sections 31-1 and 31-2 of the third segment 31 may then accommodate one water drop separator or air conditioner 91, 92. This configuration removes water and/or aerosols from the air before the air is passed to the air guiding member 8.

Generally, the segments (first, second, third etc.) of the air duct are coupled such that they are in fluidic communication with each other and other air guiding components (for example air guiding structure 8) such that the air can pass through the segments and to the air guiding structure 8.

In an aspect of the invention, the air duct may be assembled within the tower of the wind power plant.

Although the invention has been described hereinabove with reference to specific embodiments, it is not limited to these embodiments and no doubt further alternatives will occur to the skilled person that lie within the scope of the invention as claimed.

The invention claimed is:

1. An air duct for a wind power plant comprising:
   a body having an outer circumference and configured to guide air along a circumference of a supporting tower structure of the wind power plant; and
   a plurality of air inlets in the body, the plurality of air inlets each protruding from the outer circumference such that the plurality of air inlets are configured to extend through a wall of the supporting tower structure,
   wherein the body is configured to be located inside the supporting tower structure along an inner side of the wall of the supporting tower structure, and
   wherein the body is a separate member from the supporting tower structure configured to be fixed to the supporting tower structure such that the body is not integral to the wall of the supporting tower structure.

2. The air duct according to claim 1, wherein the body is located inside the supporting tower structure, and is positioned along an inner side of the wall of the supporting tower structure.

3. The air duct according to claim 2, wherein the plurality of air inlets are evenly distributed around the circumference of the supporting tower structure.

4. The air duct according to claim 1, wherein the body has a polygonal cross-section.

5. The air duct according to claim 4, wherein the polygonal cross-section comprises two opposite V-shape cross-sectional portions.

6. The air duct according to claim 1, wherein the body is comprised of a plurality of segments.

7. The air duct according to claim 6, the body is comprised of a first set of segments comprising a plurality of first segments each comprising an inlet, and a second set of segments comprising a plurality of second segments to couple first segments to each other, and a third segment to couple the body to an internal vertical tubular air guiding structure.

8. The air duct according to claim 1, wherein the body is comprised of a first segment comprising an inlet, and a second segment to couple to the first segment, and a third segment to couple the air duct to an internal vertical tubular air guiding structure.

9. The air duct according to claim 1, further comprising a fixed structure to couple the body to the supporting tower structure, wherein the fixed structure is at least one brace or a frame to support the body.

10. The air duct according to claim 1, wherein the body includes at least two segments wherein adjacent segments have flanged ends and wherein adjacent or consecutive segments are fixed to each other.

11. The air duct according to claim 1, further comprising an air duct suspension, wherein the air duct suspension is a belt.

12. The air duct according to claim 1, wherein segments of the body are made of at least one of glass-fiber, plastic, and polymer.

13. A wind power plant comprising:
a supporting tower structure; and
an air duct configured to guide air along a circumference of the supporting tower structure of the wind power plant, the air duct including a plurality of air inlets in a body, the body including an outer circumference, the plurality of air inlets each protruding from the outer circumference and extending through a wall of the supporting tower structure, wherein the air duct is configured to be located inside the supporting tower structure along an inner side of the wall of the supporting tower structure, wherein the air duct is a separate member from the supporting tower structure configured to be fixed to the supporting tower structure such that the air duct is not integral to the wall of the supporting tower structure.

14. A method of manufacturing an air duct comprising the step of:
assembling an air duct of a plurality of segments, wherein at least two of the plurality of segments are identical, the air duct including a body having an outer circumference; and
configuring the air duct as a separate member from a supporting tower structure of a wind power plant such that the air duct includes a plurality of air inlets in the air duct protruding from the outer circumference of the body, the air duct being adapted to be attached to the supporting tower structure of the wind power plant along an inner side of a wall of the supporting tower structure and having the air inlets extending through the wall of the supporting tower structure, without the air duct being integral to the wall of the supporting tower structure, so as to guide air along a circumference of the supporting tower structure.

15. The method according to claim 14, further comprising assembling the air duct within the supporting tower structure of the wind power plant.

16. A method of retrofitting an existing wind power plant comprising the step of:
installing in the existing wind power plant an air duct for the existing wind power plant, the air duct including a body having an outer circumference, the air duct including a plurality of air inlets protruding from the outer circumference, the air duct being a separate member from the existing wind power plant prior to the installing; and
fixing the air duct to a supporting tower structure of the existing wind power plant along an inner side of a wall of the supporting tower structure and having the air inlets of the air duct extend through the wall of the supporting tower structure without the air duct being integral to the wall of the supporting tower structure, so as to guide air along a circumference of the supporting tower structure of the existing wind power plant.

* * * * *